United States Patent [19]

Akiyama

[11] Patent Number: 4,804,713
[45] Date of Patent: Feb. 14, 1989

[54] PRESSURE SENSITIVE ADHESIVE RESIN COMPOSITION

[75] Inventor: Saburo Akiyama, Koganei, Japan

[73] Assignee: Central Glass Company, Limited, Ube City, Japan

[21] Appl. No.: 114,042

[22] Filed: Oct. 29, 1987

[30] Foreign Application Priority Data

Nov. 5, 1986 [JP] Japan .................. 61-261805

[51] Int. Cl.$^4$ .................................. C08L 27/6
[52] U.S. Cl. .................. 525/185; 525/190; 525/199
[58] Field of Search .................. 525/183, 190, 185

[56] References Cited

U.S. PATENT DOCUMENTS

| 4,591,616 | 5/1986 | Miyata et al. | 525/185 |
| 4,617,350 | 10/1986 | Maeda et al. | 525/153 |
| 4,687,295 | 8/1987 | Koishi et al. | 350/96.34 |

FOREIGN PATENT DOCUMENTS 57-177077 10/1982 Japan .

OTHER PUBLICATIONS

Handbook of Pressure Sensitive Adhesive Technology, Van Nostrand Reinhold Co., N.Y., 1982, pp. 353–369, (J. Schlademan).

*Primary Examiner*—Wilbert J. Briggs, Sr.
*Assistant Examiner*—Annabel Y. Lee
*Attorney, Agent, or Firm*—Fleit, Jacobson, Cohn & Price

[57] ABSTRACT

A fluororesin composition useful as a pressure sensitive adhesive is obtained by blending 2–50 wt % of a copolymer of vinylidene fluoride and hexafluoroacetone with a copolymer of 2-ethylhexyl acrylate and at least one other vinylic monomer. As the latter copolymer, either a copolymer made up of at least 60 mol % of 2-ethylhexyl acrylate and the balance of methacrylic ester(s) or a copolymer of 50–95 mol % of 2-ethylhexyl acrylate, 5–40 mol % of vinyl acetate and 0–40 mol % of additional vinylic comonomer(s) selected from acrylic acid and its esters and methacrylic acid and its esters is suitable. This resin composition is sufficiently strong in both tack adhesion power and cohesive force and has excellent weatherability, water resistance and oil resistance.

4 Claims, No Drawings

PRESSURE SENSITIVE ADHESIVE RESIN COMPOSITION

BACKGROUND OF THE INVENTION

This invention relates to a fluororesin composition useful as a pressure sensitive adhesive composition. Essentially the resin composition is a blend of a vinylidene fluoride base copolymer and an acrylate base copolymer.

Most of conventional pressure sensitive adhesives for adhesive tapes and sheets are essentially composed of an elastomeric polymer and a tackifier. The elastomeric polymer, which provides cohesive force, is selected from natural and synthetic rubbers, polyvinyl ether, polyvinyl acetate, polyacrylates, silicone resins, etc. Rubber base compositions have been long predominant, but in recent years acrylic resin base pressure sensitive adhesive compositions have achieved a remarkable development.

Acrylic polymers are superior to rubbers in weather resistance and oil resistance. Besides, acrylic monomers are high in copolymerizing capabilities so that it is easy to variously modify acrylic resins by copolymerization with consideration of variations in polarity of the surfaces to which the respective adhesives are to be applied.

However, thermoplastic acrylic polymers are generally low in intermolecular cohesive force and, therefore, are insufficient in creep resistance and heat resistance. A known technique to acquire an improved balance of tack adhesion strength and cohesive force is producing a copolymer comprising an acrylic ester segment relatively large in chain length and relatively low in glass transition temperature ($T_g$) and another acrylic or methacrylic ester segment shorter in chain length and higher in $T_g$. Besides such two components sometimes a polar vinylic monomer is copolymerized as a third component for further enhancement of the cohesive force. Also it is known to solve the problem of insufficient cohesive force by introducing reactive radicals into acrylic polymers to obtain cross-linkably modified acrylic resins.

Despite such efforts still it is difficult to afford sufficiently strong cohesive force to a pressure sensitive adhesive composition having good weatherability, heat resistance, water resistance and oil resistance. Besides, when a fluororesin is used as the base material of an adhesive tape there is a problem that few of conventional pressure sensitive adhesive compositions can well wet the tape base.

SUMMARY OF THE INVENTION

It is an object of the present invention to provide a novel resin composition useful as a pressure sensitive adhesive material, which has a good balance of tack adhesion strength and cohesive force as well as excellent weatherability, water resistance and oil resistance.

To accomplish the above object this invention provides a resin composition comprising a blend of 2-50 wt % of a first copolymer of vinylidene fluoride and hexafluoroacetone and the balance of a second copolymer of 2-ethylhexyl acrylate and at least one other kind of vinylic monomer.

More specifically, the first copolymer in this polymer blend is made up of 60-97 mol % of vinylidene fluoride and 40-3 mol % of hexafluoroacetone. As the second copolymer, either a copolymer comprising at least 60 mol % of 2-ethylhexyl acrylate units and the balance of at least one other kind of vinylic compound units or a copolymer comprising 50-95 mol % of 2-ethylhexyl acrylate units, 5-40 mol % of vinyl acetate units and 0-40 mol % of additional vinylic compound units is preferred.

The gist of the invention is blending a specific fluororesin with a specific acrylic resin, viz. 2-ethylhexyl acrylate base copolymer. The fluororesin is a copolymer of vinylidene fluoride (VDF) and hexafluoro-acetone (HFA) which has a large polar radical. A VDF-HFA copolymer and a 2-ethylhexyl acrylate base copolymer are very good in mutual solubility or compatibility with each other, so that blending of these two copolymers gives a uniphase plastic system which is strong in cohesive force and does not easily undergo cohesive fracture.

In other respects a resin composition according to the invention exhibits a good tack adhesion power and, as it is a fluororesin, possesses excellent weatherability, water resistance and oil resistance. This resin composition can well wet various kinds of tape and sheet materials such as papers, cloths and plastics including fluororesins and can be advantageously used in pressure sensitive adhesive tapes and sheets and also in release papers. Optionally a conventional tackifier may be added to the polymer blend according to the invention to obtain a pressure sensitive adhesive having still enhanced tack adhesion power. Also it is an advantage of the invention that the adhesion strength of the resin composition can easily be controlled over a wide range by simply varying the proportions of the two copolymers to be blended.

DESCRIPTION OF THE PREFERRED EMBODIMENTS

In a VDF-HFA copolymer used in this invention the amount of VDF is not more than 97 mol % and, preferably, is not less than 60 mol %. If VDF amounts to more than 97 mol % the copolymer becomes too high in crystallinity and low in tack adhesion power, and a blend of such a VDF-HFA copolymer and a 2-ethylhexyl acrylate (EHA) base copolymer is relatively weak in cohesive force because of degraded mutual solubility of the blended copolymers. On the other hand, decreasing the proportion of VDF to less than 60 mol % leads to an unbearable rise in the production cost of the VDF-HFA copolymer because of a great decrease in the yield of the copolymerization reaction.

The other component of a polymer blend according to the invention is a copolymer comprising EHA as the primary component. A preferred EHA base copolymer is one comprising at least 60 mol % of EHA units and the balance of at least one other kind of vinylic compound units. Another preferred EHA base copolymer is one comprising 50-95 mol % of EHA units, 5-40 mol % of vinyl acetate (VAc) units and 0-40 mol % of additional vinylic compound units. For either of the preferred EHA base copolymers, good examples of vinylic comonomers other than EHA and VAc are acrylic acid, methacrylic acid, acrylic esters, methacrylic esters, fluoroacrylates, acrylonitrile, butadiene, styrene, vinyl chloride and vinyl ether. Among these, methacrylic esters such as methyl, ethyl, propyl and butyl methacrylates are preferable for EHA base copolymers not comprising VAc, while acrylic acid, methacrylic acid and methacrylic esters are preferred for EHA base copolymers comprising VAc.

A VDF-HFA copolymer and an EHA base copolymer are blended such that the VDF-HFA copolymer amounts to 2–50 wt %, and preferably 5–30 wt %, of the obtained polymer blend. It is suitable to accomplish the blending by a solution blending method using an organic solvent in which the both copolymers are well soluble. The solvent can be selected from ketones, esters, cyclic ethers and other kinds of polar solvents and may be a mixed solvent.

The two-component polymer blend itself serves as a pressure sensitive adhesive, and it is free to add a known tackifier to this polymer blend for further enhancement of tack adhesion power. Examples of useful tackifiers are rosin, modified and/or esterified rosin, phenol resins, alkylphenol resins, polyterpenes, terpenephenol resins, aliphatic polyhydrocarbons, coumaroneindene resins, styrene resins and aromatic petroleum resins. Considering compatibility with the blended copolymers, it is preferable to select a tackifier from rosins, phenol resins, alkylphenol resins and terpenephenol resins. The amount of addition of tackifier is widely variable according to the intended use of the adhesive resin composition and may range from 0 to about 150 parts by weight per 100 parts by weight of the polymer blend. Besides tackifier, any of ordinary additives such as plasticizers, antioxidants, stabilizers and pigments can be added to the polymer blend. In applying a pressure sensitive adhesive resin composition according to the invention to a tape or sheet, it is usual to use a solution of the resin composition in an organic solvent.

The invention is further illustrated by the following nonlimitative examples.

EXAMPLE 1

A copolymer of 91 mol % of VDF and 9 mol % of HFA and a copolymer of 80 mol % of EHA and 20 mol % of methyl methacrylate (MMA) were prepared each by a radical polymerization process.

The two copolymers were blended by dissolving the both copolymers in methylisobutyl ketone. The blending was made in three different proportions of the VDF-HFA copolymer to the EHA-MMA copolymer, viz. 5/95, 10/90 and 30/70 by weight. In every case the solution of the polymer blend was coated on a fluororesin tape 20 mm in width by using a film applicator, and the liquid coating film was heated at 90° C. for 5 min to evaporate the solvent to thereby obtain an adhesive tape with an adhesive layer having a thickness of 40 μm.

Table 1 shows the tack and adhesion strength of the adhesive tapes produced in this example. The tack was measured by the J. Dow boll rolling test method and is indicated by the ball number. The adhesion strength refers to peel strength measured by pressure bonding the adhesive tape to a stainless steel (SUS 304) plate, folding back an end region of the tape by an angle of 180° and applying an increasing pull force to peel the tape at a rate of 200 mm/min.

TABLE 1

| P(VDF—HFA)/P(EHA—MMA) (weight ratio) | Tack (Ball No.) | Strength Strength (g/20 mm) |
|---|---|---|
| 5/95 | 14 | 450 |
| 10/90 | 14 | 420 |
| 30/70 | 10 | 413 |

EXAMPLE 2

The VDF-HFA copolymer prepared in Example 1 was blended with a radical copolymer of 80 mol % of EHA, 15 mol % of VAc and 5 mol % of acrylic acid (AA) by dissolving the both copolymers in methylisobutyl ketone. The weight ratio of the VDF-HFA copolymer to the EHA-VAc-AA copolymer was varied to 5/95, 10/90, 30/70 and 50/50 by weight. Using the solution of each polymer blend, an adhesive tape was produced by the same method as in Example 1. In every adhesive tape the thickness of the adhesive layer was 38 μm. The tack and adhesion strength of the obtained adhesive tapes were as shown in Table 2.

EXAMPLE 3

The VDF-HFA copolymer prepared in Example 1 was blended with a copolymer of 52 mol % of EHA, 28 mol % of VAc and 20 mol % of AA. The blending was done in the same manner as in Example 1, and the solution of each polymer blend was used in producing an adhesive tape by the same method as in Example 1. In every adhesive tape the thickness of the adhesive layer was 38 μm. The tack and adhesion strength of the obtained adhesive tapes were as shown in Table 2.

EXAMPLE 4

A copolymer of 88 mol % of VDF and 12 mol % of HFA was blended with a copolymer of 60 mol % of EHA, 15 mol % of VAc and 25 mol % of AA. The blending was done in the same manner as in Example 1. Using the solution of each polymer blend an adhesive tape was produced by the same method as in Example 1. In every adhesive tape the thickness of the adhesive layer was 45 μm. The tack and adhesion strength of the obtained adhesive tapes were as shown in Table 2.

COMPARATIVE EXAMPLE 1

The VDF-HFA copolymer prepared in Example 1 was blended with a radical copolymer of 40 mol % of EHA, 15 mol % of VAc and 45 mol % of AA. The blending was done in the same manner as in Example 1, and the solution of each polymer blend was used in producing an adhesive tape by the same method as in Example 1. In every adhesive tape the thickness of the adhesive layer was 40 μm. The tack and adhesion strength of the obtained adhesive tapes were as shown in Table 3.

COMPARATIVE EXAMPLE 2

The VDF-HFA copolymer prepared in Example 1 was blended with a radical copolymer of 70 mol % of ethyl acrylate (EA), 20 mol % of VAc and 10 mol % of AA. The blending was done in the same manner as in Example 1, and the solution of each polymer blend was used in producing an adhesive tape by the same method as in Example 1. In every adhesive tape the thickness of the adhesive layer was 41 μm. The tack and adhesion strength of the obtained adhesive tapes were as shown in Table 3.

TABLE 2

| | Tack (Ball No.) | Adhesion Strength (g/20 mm) |
|---|---|---|
| Example 2 P(VDF—HFA)/P(EHA—VAc—AA) (91:9) (80:15:5) | | |

TABLE 2-continued

|  | Tack (Ball No.) | Adhesion Strength (g/20 mm) |
|---|---|---|
| (weight ratio) | | |
| 5/95 | 15 | 480 |
| 10/90 | 15 | 470 |
| 30/70 | 13 | 430 |
| 50/50 | 10 | 310 |
| Example 3 P(VDF—HFA)/P(EHA—VAc—AA) (91:9) (52:28:20) (weight ratio) | | |
| 5/95 | 14 | 450 |
| 10/90 | 13 | 425 |
| 30/70 | 12 | 401 |
| Example 4 P(VDF—HFA)/P(EHA—VAc—AA) (88:12) (60:15:25) (weight ratio) | | |
| 5/95 | 14 | 440 |
| 10/90 | 13 | 410 |
| 30/70 | 12 | 406 |

TABLE 3

|  | Tack (Ball No.) | Adhesion Strength (g/20 mm) |
|---|---|---|
| Comparative Example 1 P(VDF—HFA)/P(EHA—VAc—AA) (91:9) (40:15:45) (weight ratio) | | |
| 5/95 | 12 | 280 |
| 10/90 | 12 | 285 |
| 30/70 | 9 | 220 |
| Comparative Example 2 P(VDF—HFA)/P(EA—VAc—AA) (91:9) (70:20:10) (weight ratio) | | |
| 5/95 | 12 | 190 |
| 10/90 | 11 | 182 |
| 30/70 | 10 | 163 |

EXAMPLE 5

The VDF-HFA copolymer prepared in Example 1 and the EHA-VAc-AA copolymer prepared in Example 2 were blended in methylisobutyl ketone. The proportions of the two copolymers were varied as shown in Table 4. In each case a commercial tackifier (esterified rosin base) was added to the polymer blend solution. The amount of the tackifier was 50 parts by weight per 100 parts by weight of the polymer blend. Using the solution of each polymer blend an adhesive tape was produced by the same method as in Example 1. In every adhesive tape the thickness of the adhesive layer was 48 μm. The tack and adhesion strength of the obtained adhesive tapes were as shown in Table 4.

TABLE 4

|  | Tack (Ball No.) | Adhesion Strength (g/20 mm) |
|---|---|---|
| P(VDF—HFA)/P(EHA—VAc—AA) (91:9) (80:15:5) (weight ratio) | | |
| 5/95 | 18 | 525 |
| 10/90 | 18 | 520 |
| 30/70 | 17 | 490 |
| 50/50 | 14 | 440 |

What is claimed is:

1. A resin composition useful as a pressure sensitive adhesive material, comprising a blend of 2–50 wt % of a first copolymer of 60–97 mol % of vinylidene fluoride and 40–3 mol % of hexafluoroacetone and the balance of a second copolymer of 50–95 mol % of 2-ethylhexyl acrylate, 5–40 mol % of vinyl acetate and 0–40 mol % of at least one additional vinylic monomer.

2. A resin composition according to claim 1 wherein said at least one additional vinylic monomer is selected from the group consisting of acrylic acid, methacrylic acid, acrylic esters and methacrylic esters.

3. A resin composition according to claim 1, wherein said first copolymer amount to 5–30 wt % of said blend.

4. A resin composition according to claim 1, further comprising a tackifier.

* * * * *